July 29, 1969 SETSUO AOKI ET AL 3,458,175
BLENDER
Filed April 15, 1968  3 Sheets-Sheet 1
FIG. 4
FIG. 1
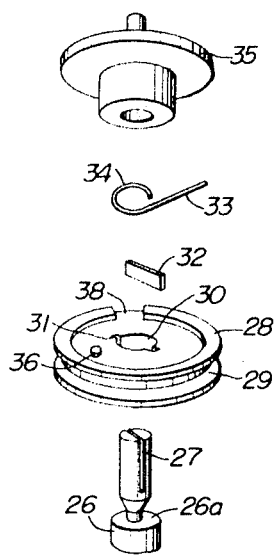
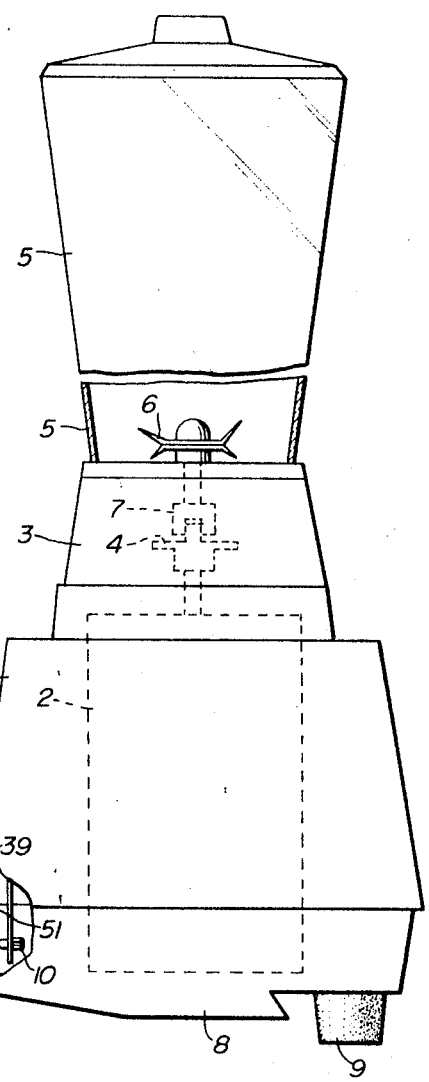
FIG. 5
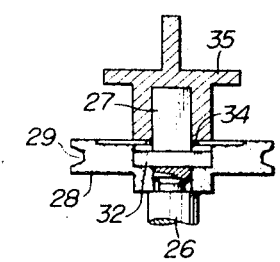
FIG. 2
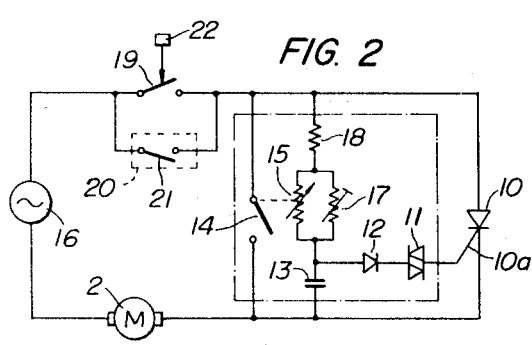

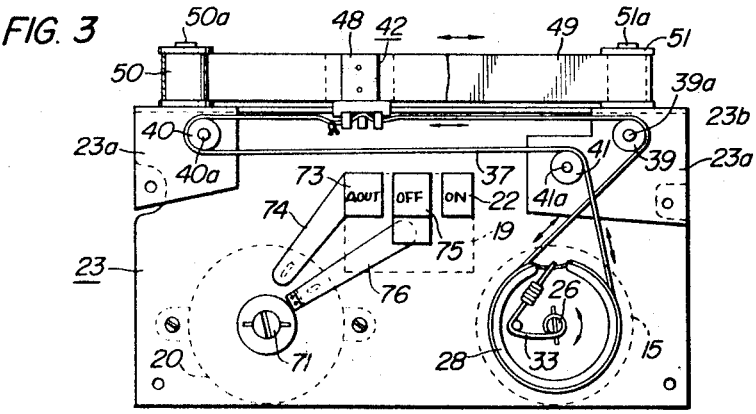
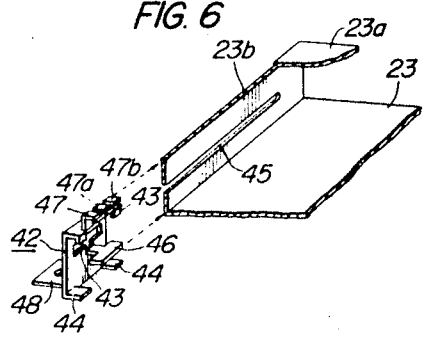
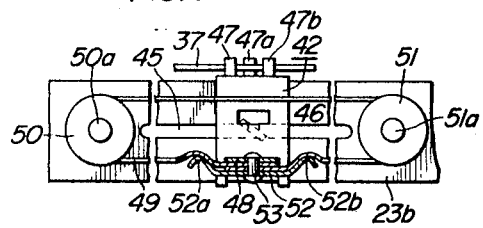
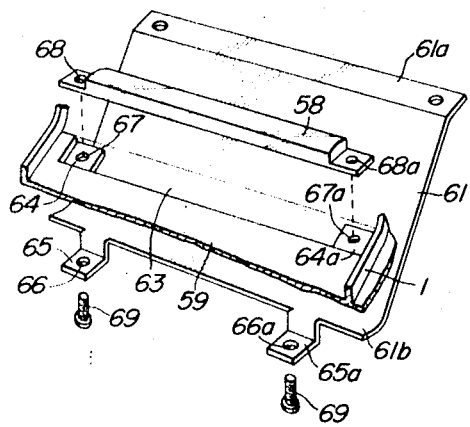
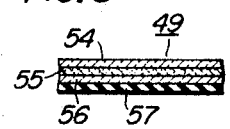

United States Patent Office 3,458,175
Patented July 29, 1969

3,458,175
BLENDER
Setsuo Aoki, Osaka, Setsuo Shono, Suita-shi, Ryoji Ito, Minoo-shi, Yuzuru Arao, Nishinomiya-shi, and Masao Hukunaga, Toyonaka-shi, Japan, assignors to Matsushita Electric Industrial Co., Ltd., Osaka, Japan, a corporation of Japan
Filed Apr. 15, 1968, Ser. No. 721,466
Claims priority, application Japan, Apr. 17, 1967 (utility models), 42/32,936, 42/32,937, 42/32,938, 42/32,942, 42/32,949
Int. Cl. A47j 43/046; H03j 1/02
U.S. Cl. 259—108                                              6 Claims

ABSTRACT OF THE DISCLOSURE

A blender for carrying out various types of preparation of a material, such as stirring, blending and crushing, while cutting said material by a motor-driven cutter, which blender is provided with an indicating device wherein a belt is employed as means for indicating the rate of rotation of the motor in relation to the types of preparation.

BACKGROUND OF THE INVENTION

The present invention relates to a blender and more particularly to such a blender which is provided with an indicating device including a belt as means for indicating the rate of rotation of a motor in relation to the types of preparation.

The indicating devices provided in conventional blenders for indicating the rate of rotation of a motor in relation to the types of preparation are almost without exception of the type which comprises a combination of a knob mounted on the rotary shaft of a motor controller and a marking plate provided adjacent to the periphery of said knob.

With such indicating devices, since the rotation of the rotary shaft of the motor controller is directly used for setting the knob at a marking on the marking plate representing the desired preparation, there has been the disadvantage that the area in which the markings are provided is narrow, making it difficult for the user to identify the markings, and the number of the types of preparations which can be provided on the marking plate is substantially limited.

Another type of indicating device which has been employed hitherto is of the push-button type which is arranged so that the motor is driven at a rate corresponding to the desired preparation when a button for that preparation has been depressed. According to this type, therefore, it is necessary to provide push buttons in a number equal to the number of desired preparations and thus the structure of the indicating device is rendered complicate. If the number of push buttons is reduced, the scope of application of the blender will be restricted. For the above reasons, neither of the conventional indicating devices has been entirely satisfactory.

SUMMARY OF THE INVENTION

The indicating device incorporated in the blender according to the present invention employs a belt as means for indicating the rate of rotation of a motor in relation to the types of preparation. The indicator belt is caused to make a rectilinear movement by a mechanism which comprises a large pulley mounted on the rotary shaft of a motor speed controller, three small pulleys arranged in a substantially triangular shape, a string engaged around said large and small pulleys, and a sliding member connecting said indicator belt with said string and adapted to make a horizontal rectilinear movement, said indicator belt being exposed exteriorly through a window provided in the blender body so as to be visible to the user.

An object of the present invention is to provide a blender which is provided with an indicating device of the type wherein the rotational motion of the rotary shaft of a motor speed controller is converted into a rectilinear motion of a belt serving as an indicator, whereby the rate of rotation of the motor is indicated continuously relative to the types of preparation and markings of the types of preparation can be provided in an expanded area providing for ready identification of the same by the user.

Another object of the present invention is to provide a blender which is provided with an indicating device of the type described wherein the indicator belt is held tense by a simple mechanism so as to ensure reliable rotation of said belt.

Still another object of this invention is to provide a blender which is provided with an indicating device of the type described wherein means for connecting the indicator belt with a loop of string, driven by the rotating force of the rotary shaft of a motor speed controller, through a sliding member and means for slidably engaging said sliding member with a guide wall for smooth sliding movement thereon are all provided on said sliding member integrally therewith, whereby the number of component parts of the indicating device is minimized.

Still another object of this invention is to provide a blender which is provided with an indicator device of the type described wherein the component parts of the indicating device, such as a large pulley mounted on the rotary shaft of the motor speed controller, the string to operate the indicator belt and a spring to impart a tension to said string, are arranged in such a manner that they can be assembled and disassembled readily, and further the device is made so that the spring may not fly away upon severance of said string.

Still another object of this invention is to provide a blender which is provided with an indicating device of the type described wherein the indicator belt comprises a colored film layer which will not be damaged or fade over a prolonged period and means by which the influence of light is eliminated to keep said colored film layer visible to the user.

Still another object of this invention is to provide a blender which is provided with an indicating device of the type described wherein a window member through which the indicator belt is observed is simple in structure and can be mounted with ease.

BRIEF DESCRIPTION OF THE DRAWINGS

For a fuller understanding of the invention, reference is made to the following description of an embodiment of the invention taken in conjunction with the accompanying drawings.

FIGURE 1 is a side view of a blender according to this invention with an intermediate portion of the cup cut away and a portion of the body cut away to show an indicating device incorporated in the blender.

FIGURE 2 is an electrical circuit diagram of the blender.

FIGURE 3 is an enlarged plan view showing the mechanism of the indicating device.

FIGURE 4 is an exploded perspective view illustrating the manner in which a large pulley, a wedge member, a spring and a knob, composing the indicating device, are mounted on the rotary shaft of a motor speed controller.

FIGURE 5 is a cross sectional view of the component parts shown in FIGURE 4 in an assembled state.

FIGURE 6 is a perspective view of a sliding member and a portion of a guide wall of a base plate of the indicating device, illustrating the structure of said sliding member and the manner of engagement between said sliding member and said guide wall.

FIGURE 7 is a plan view with portions cut away illustrating the manner in which an indicator belt is connected to the sliding member.

FIGURE 8 is a fragmentary cross sectional view of the indicator belt.

FIGURE 10 is an exploded perspective view of the window portion of the indicating device illustrating the manner in which a window member is mounted.

DESCRIPTION OF THE PREFERRED EMBODIMENT

Figure 9:
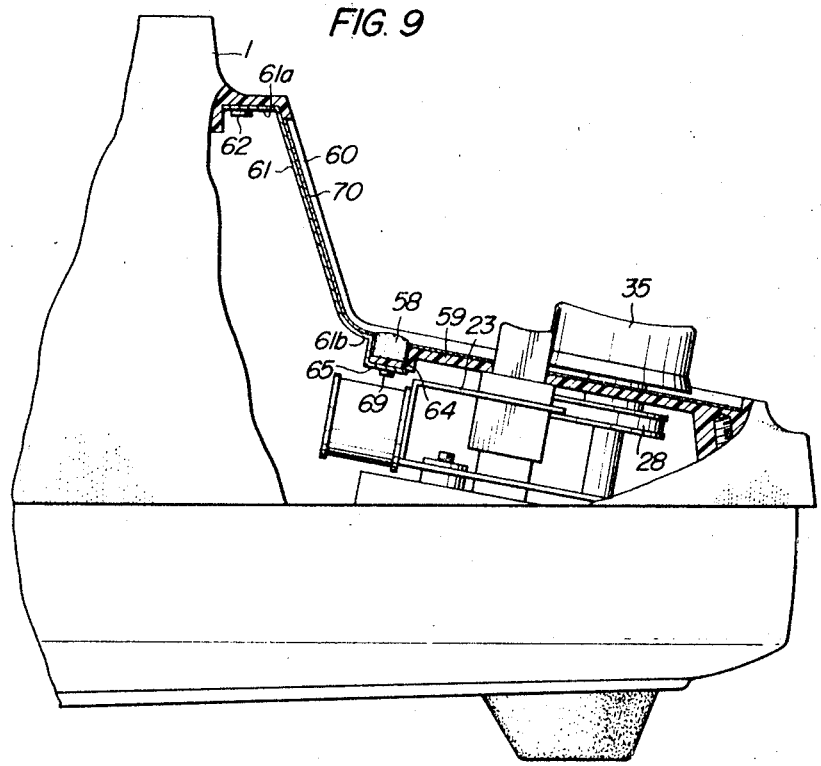
FIGURE 9 is a fragmentary side view of the body of the blender, wherein a portion of the body is broken away showing in cross section the structure of a window portion of the indicating device.

Referring to FIG. 1, reference numeral 1 designates the body of a blender, in which a motor 2 is mounted. The rotary shaft of the motor 2 is extending upwardly into the lower portion of an auxiliary body 3 mounted on top of the body 1 and a lower coupling 4 is connected to the top end thereof. On top of the auxiliary body 3 is removably mounted a transparent cup 5. The lower coupling 4 is in engagement with an upper coupling 7 which is connected to a rotary cutter 6 disposed in the bottom portion of the cup 5. Thus, it will be seen that the cutter 6 is driven from the motor 2 through the upper and lower couplings 7 and 4. The open bottom end of the body 1 is covered with a bottom closure 8.

The electrical circuit diagram of the blender is shown in FIG. 2. All of the component parts composing the electrical circuit are accommodated in the body 1, as well as the motor 2. The electrical circuit, as shown in FIG. 2, is composed of a main circuit comprising the motor 2 and a silicon controlled rectifier element 10 (hereinafter referred to as S.C.R. for simplicity) connected with said motor in series, and a firing circuit for impressing a voltage on a gate 10a of the S.C.R.

The firing circuit is composed of a diac 11, a diode 12, a condenser 13 and a variable resistor 15 provided with a switch 14. The variable resistor 15 and the condenser 13 are connected in series across a power source 16, while the diode 12 and the diac 11 are connected in series across a common terminal of the condenser 13 and the variable resistor 15, and the gate 10a of the S.C.R. 10. The switch 14 is connected across the power source 16 and closed when the resistance value of the variable resistor 15 becomes minimum to short the S.C.R. 10. Reference numeral 17 designates a semi-fixed resistor connected in parallel with the variable resistor 15. This semi-fixed resistor is locked with a paint or the like after adjusting the lowest rate upon absorbing the irregularities of the individual component parts and adjusting the control circuit as a unit. A protective resistor 18 is connected in series with the variable resistor 15 and the semi-fixed resistor 17 for the purpose of preventing an excessive current which will occur when the resistance value of the variable resistor 15 becomes excessively small. Reference numeral 19 designates a switch connected to the control circuit and 20 designates a time switch connected to the control circuit in parallel with the switch 19. The time switch 20 is provided with a time control switch 21.

The control circuit described above will operate in the following manner. Namely, when a button 22 of the switch 19 is depressed, said switch 19 is closed and a voltage is impressed on the control circuit. At the same time, the condenser 13 is charged and, when the voltage thereof has reached the discharge voltage of the diac 11, the diac 11 fires the gate 10a energizing the S.C.R. 10, whereby a current is supplied to the motor 2 setting said motor in operation. This operation is repeated at each cycle of the source voltage and the frequency of energization of the diac 11 is determined by the time constant established by charging and discharging of the variable resistor 15 and condenser 13.

Therefore, when the resistance value of the variable resistor 15 is progressively decreased by rotating said variable resistor, the rate of rotation of the motor 2 increases without steps and will exceed the controllable range of the S.C.R., that is, from about 2000 to about 8000 r.p.m., at a rotational angle of about 270°. Further rotation of the variable resistor will result in closure of the switch 14 shorting the anode and cathode of the S.C.R. 10, whereby the full wave of alternating current is impressed on the motor 2 and the rate of rotation of the motor reaches the maximum rate of about 12,000 r.p.m. The motor 2 will stop rotating when the switch 19 is opened.

The present invention is concerned with an indicating device adapted for use in such equipment as a blender, which indicates such a change in r.p.m. of the motor 2 caused upon rotation of the variable resistor 15 in relation to the types of preparation.

The indicating device, as shown in FIG. 1, is disposed as a unit in the forwardly projecting portion of the body 1. Namely, with reference to FIG. 1 and FIGS. 3 to 11 inclusive, a base plate 23 for mounting the indicating device thereon is fitted to bosses 24 by screws 25 which bosses are extending downwardly from the underside of the body 1. The variable resistor 15 is fixedly mounted on the base plate 23 and its rotary shaft 26 is provided with an axial slot 27 in the top end thereof as shown in FIG. 4. A large pulley 28 has an annular groove 29 formed in the peripheral surface and a mounting hole 30 formed in the center thereof, and rectangular notches 31 are formed in the edge of the mounting hole 30 in diametrically opposed relation as shown in FIG. 4. The large pulley 28 is fitted on the rotary shaft 26 of the variable resistor 15 with the latter extending through the mounting hole 30 and rests on an annular shoulder 26a formed in said rotary shaft. The large pulley 28 is unrotatably secured to the rotary shaft 26 by means of a wedge member 32 which is fitted in the notches 31 in said pulley and the slot 27 in said rotary shaft. A spring 33 has a loop 34 formed at one end thereof and is mounted on the large pulley 28 with the rotary shaft extending through said loop 34. The spring 33 is trailed around a projection 36, upstanding on the top surface of the pulley 28, and the other end thereof is hooked on a string 37, engaged around said pulley 28, in a manner shown in FIG. 3, so as to pull said string inwardly of said pulley through a guide opening 38 formed in the peripheral edge wall of the pulley and thereby to give a tension to said string. After placing the spring 33 in the manner described, a knob 35 is fitted on the rotary shaft 27 with said spring interposed between it and the pulley 28. Small pulleys 39, 40 and 41 are rotatably mounted on mounting lugs 23a and 23a of the base plate 23 by means of pins 39a, 40a and 41a respectively. These small pulleys also have an annular groove formed in the peripheral surfaces thereof for trailing the string 37 therein, though not shown i the figures. The mounting lugs 23a are extending horizontally from the opposite ends of a vertical guide wall 23b upstanding from the base plate, so that the small pulleys 39, 40 and 41 may be positioned on the same level as the large pulley 28.

The string 37 is engaged around both the large pulley 28 and the small pulleys 39, 40 and 41 in the following manner. Namely, as shown in FIG. 3, the string 37 is first trailed around the large pulley 28 twice and, after being crossed, trailed around the small pulley 41 and then trailed around the remaining small pulleys 39 and 40. Since the string 37 is held tense under the action of the spring 33, as described previously, when the knob 35 is revolved the string is moved in one direction or another by the rotating pulley 28.

Reference numeral 42 designates a sliding member which consists of a flat plate provided with clamping lugs 43 and 44 projecting perpendicularly from the opposite ends of both the upper and lower edges thereof. This sliding member 42 is slidably mounted on the guide wall 23b of the base plate 23 with the clamping lugs 43 and 44 clamping the upper and lower edges of the guide wall 23 as shown in FIG. 6. In order to ensure that the sliding member 42 will not be detached from the guide wall 23b and slide on said guide wall exactly, the sliding member is further provided with a T-shaped cut bent lug 46 at the central portion thereof which is loosely received in a longitudinal slot 45 formed in the guide wall when the sliding member is mounted on the guide wall. After mounting the sliding member 42, the forward end of the cut bent lug 46, extending through the longitudinal slot 45, is twisted to keep the sliding member in engagement with the guide wall.

The sliding member 42 is also provided at the top edge thereof with three independent, inverted L-shaped hooks 47, 47a and 47b, on which the string 37 is hooked zigzag. The sliding member 42 is also provided with a lug 48 which is bent in the opposite direction to the cut bent lug 46 and on which an indicator belt 49 is secured.

All of the above-mentioned lugs 43, 44 and cut bent lug 46, for slidably mounting the sliding member 42 on the guide wall 23b, hooks 47, 47a, 47b for fixing the string 37 thereto, and lug 48 for connecting the indicator belt 49 with the sliding member, are formed integrally with said sliding member.

The indicator belt 49 is engaged around pulleys 50 and 51 which are rotatably mounted on respective pins 50a and 51a at the opposite ends of the guide wall 23b. Reference numeral 52 designates an undulated leaf spring fixed to the indicator belt mounting lug 48 of the sliding member 42 by means of a rivet 53, together with both ends of the indicator belt 49. As shown in FIG. 7, the raised ends 52a and 52b of the undulated leaf spring 52 are resiliently pressed against the indicator belt 49 to produce a tension in said indicator belt over the entire length thereof.

The indicator belt 49 consists of a laminate of four thin film layers as shown in FIG. 8. Namely, an insulating transparent layer 54 constituting the surface layer, a color film layer 55 consisting, for example, of a paint, a light intercepting film layer 56 consisting of silver powder vacuum evaporated on the backside of said color film layer 55 to enhance the vividness of said color film and an insulating film layer 57 are integrally bonded to each other from the top to the bottom in the order mentioned.

Reference numeral 58 designates a transparent window member arranged at a portion of a forwardly extending control panel 59 of the body 1 in confronting relation to the indicator belt 49. The colored portion of the indicator belt 49, representing the rate of rotation of the motor 2 is observed through the window member 58.

The window member 58 is mounted in position in the following manner. Namely, since the body 1 has an L-shaped cross section, difficulty is encountered in molding said body using a metal mold. Therefore, the body 1 is molded with the vertical portion of the L-shaped surface thereof open. The opening 60 thus formed in the front face of the body 1 is closed with an auxiliary plate 61 which has the top edge 61a thereof fixed to the top edge of the opening 60 by means of rivets 62 from the backside of the body 1. The lower edge 61b of the auxiliary plate 61 is so shaped as to provide a window member mounting frame 63 together with the lower edge of the opening 60. Namely, the window member mounting frame 63 is constituted by seats 64, 64a which are formed by bending the opposite ends of the lower edge of the opening 60 inwardly as shown in FIGS. 9 and 10, and L-shaped legs 65, 65a provided at the opposite ends of the lower edge 61b of the auxiliary plate 61 and abutting against the underside of said respective seats 64, 64a. The window member 58 is provided at the opposite ends thereof with threaded holes 68, 68a which are in register with threaded holes 66, 66a formed in the mounting legs 65, 65a and threaded holes 67, 67a formed in the seats 64, 64a. Thus, it will be seen that the window member 58 and the mounting legs 65, 65a of the auxiliary plate 61 can be tightened to the rigid seats 64, 64a by means of bolts 69 to be screwed into the threaded holes 66, 67, 68 and threaded holes 66a, 67a, 68a respectively from the inside of the body 1. Reference numeral 70 designates a decorative panel with an opening, corresponding to the size of the window member 58, formed therein. This decorative panel 70 is adhesively bonded to the entire areas of the front surfaces of the control panel 59 and auxiliary plate 61. The edges of the opening in the decorative panel 70 contact the window member 58 liquid-tightly so as to prevent intrusion of water therethrough.

The time switch 20 is mounted on the base plate 23 of the indicating device and a knob 72 is mounted on the shaft 71 thereof. Reference numeral 73 designates a button by which the time switch 20 is set in operation through a lever 74 and 75 designates a button by which the operation of the time switch 20 is stopped through a lever 76. These buttons 73 and 75 are mounted on the base plate 23 in side-by-side relation to the button 22 for the switch 19.

Figure 11:
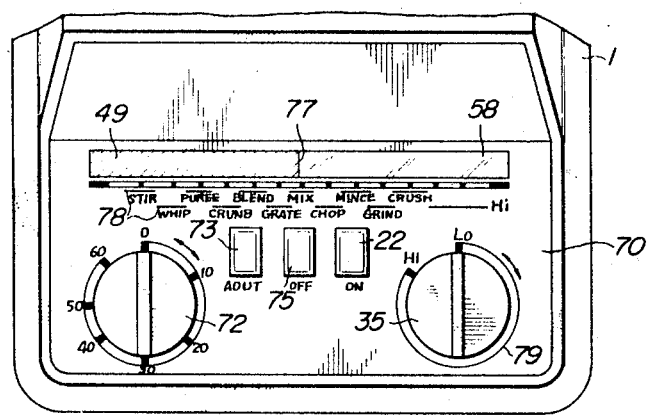
FIGURE 11 is a fragmentary plan view showing the arrangement of the indicating portion of the blender in which the indicating device is incorporated.

When the knob 35 is revolved in the direction of the arrow in FIG. 11, the variable resistor 15 is revolved and at the same time the large pulley 28 is revolved trailing the string 37 around the small pulleys 39, 40 and 41 in the directions of the arrows in FIG. 3. Accordingly, the indicator belt 49, connected integrally with the string 37 by the sliding member 42, is moved with the sliding member 42 reciprocally between the pulleys 50 and 51.

In the manner described, the user can selectively set the edge 77 of the colored portion of the indicator belt 49, appearing through the window member 58, at one of the markings 78 on the decorative panel 70 representing the desired preparation. In this case, the rate of rotation of the motor 2 is automatically controlled by the variable resistor 15 so as to be suitable for the desired preparation, and is made known to the user by a scale 79 engraved in the surface of the decorative panel 70 around the periphery of the knob 35.

The rotational motion of the vairable resistor 15 is converted into a rectilinear motion of the string 37 between the small pulleys 39 and 40 through the large pulley and small pulleys 39, 40 and 41, while being amplified by said string, large pulley and small pulleys. The amplified motion of the variable resistor can be indicated by the rectilinear movement of the indicator belt 49 connected to the string 37 by the sliding member 42. Since the indicator belt 49 can be moved continuously, the indication of said indicator belt can be further emphasized.

Furthermore, since the large pulley 28, spring 33 to impart a tension to the string 37, wedge member 32 and knob 35 are independent of each other and mounted on the rotary shaft 26 of the variable resistor 15 one after another, they can be assembled or disassembled simply with ease. Even when the string 37 is broken, the spring 33 will not fly, so that the safety of the user is assured.

Still further, since the mounting lug 48 for the indicator belt 49, hooks 47, 47a, 47b for the string 37, clamping lugs 43, 44 for engagement with the upper and lower edges of the guide wall 23b and stopper lug 46 for engagement with the slot 45 in said guide wall are all formed integrally with the sliding member 42, and said sliding member itself is mounted on the guide wall slidably, the number of component parts composing the indicating device can be reduced drastically and accordingly the structure and assembling of the same can be much simplified.

Still further, since the undulated leaf spring 52 for keeping the indicator belt 49 in a tense condition is fitted to the sliding member 42 to be carried thereby, there is no fear that the indicator belt will be rubbed or twisted by said spring during the operation, so that there is no possibility that the indicator belt will be damaged. Such an arrangement eliminates the necessity for providing a separate member for the mounting of the leaf spring and this is advantageous in reducing the size of the indicating device.

Still another advantage of the present invention is that the colored layer 55 on the indicator belt 49 is protected against fading or damage and therefore a clear indication can be obtained over a prolonged period. Even when the indicator belt 49 is illuminated from the backside thereof, the light is intercepted by the light-intercepting layer 56, so that the color of the colored film layer 55 can be kept fresh.

Still another advantage of the invention is that, since the window member 58 and auxiliary plate 61 are fixed to the body 1 simultaneously, the structure of the fitting can be simplified.

Although the present invention has been described and illustrated hereinabove with reference to a specific embodiment thereof, it is to be understood that many changes and modifications may of course be made to the details of the embodiment without departing from the scope of the invention.

We claim:

1. A blender comprising a body provided therein with a motor, a control circuit for the motor and an indicating device operatively connected with the rotary shaft of a controller for said control circuit for indicating the rate of rotation of said motor in relation to the types of preparations; a cup removably mounted on said body and a cutter disposed in the bottom portion of said cup and driven from said motor; said indicating device comprising a large pulley mounted on the rotary shaft of the controller, a plurality of small pulleys arranged in the same plane as said large pulley in a substantially triangular shape, a loop of string trailed around said large pulley and said small pulleys, a pair of pulleys mounted at right angles to a plane in which said string travels, a loop of indicator belt engaged around said pair of pulleys, a sliding member connecting said indicator belt with said string and moving along a guide wall, and a transparent window member arranged in opposed relation to said indicator belt.

2. A blender as set forth in claim 1, wherein a leaf spring is mounted on the sliding member to impart a tension to the indicator belt.

3. A blender as set forth in claim 1, wherein said sliding member is formed integrally with a mounting lug for the indicator belt, hooks for engaging the string with said sliding member, clamping lugs adapted for sliding engagement with the upper and lower edge surfaces of the guide wall and an engaging lug slidably received in a longitudinal slot formed in the guide wall, the end extremity of said engaging lug extending through said longitudinal slot being twisted, whereby said sliding member is prevented from disengaging from said guide wall.

4. A blender as set forth in claim 1, wherein said large pulley mounted on the rotary shaft of said controller is secured thereto by means of a wedge member which is fitted in an axial slot formed in said rotary shaft and notches formed in the edge of the mounting hole of said pulley in register with said axial slot, and a spring to keep the loop of string tense is fixed between said pulley and a knob mounted on the top of said rotary shaft.

5. A blender as set forth in claim 1, wherein said indicator belt is composed of a colored film layer having the top surface thereof covered by a transparent film layer and the undersurface thereof covered by a light-intercepting film layer.

6. A blender as set forth in claim 1, wherein said transparent window member is fitted in a mounting recess defined by the front edge of an auxiliary plate covering a front opening of said body and the free edge of a front flat portion of said body and secured to a pair of seats provided by L-shaped lugs formed at said front edge of the auxiliary plate and corresponding lugs formed at said free edge of the flat portion of the body and resting on top of said respective L-shaped lugs, whereby said window member and said auxiliary plate are fixed to said body.

References Cited

UNITED STATES PATENTS

| | | | |
|---|---|---|---|
| 2,137,684 | 11/1938 | Gillard | 116—124.1 |
| 2,154,406 | 4/1939 | Marholz | 116—124.1 XR |
| 2,539,458 | 1/1951 | Myers | 116—124.1 |
| 2,556,875 | 6/1951 | Hallstrand et al. | 116—124.1 |
| 2,561,672 | 7/1951 | Pritikin | 116—124.1 XR |
| 2,570,602 | 10/1951 | Shawver | 116—124.1 |
| 3,368,800 | 2/1968 | Barnard | 259—108 |

WALTER A. SCHEEL, Primary Examiner

JOHN M. BELL, Assistant Examiner

U.S. Cl. X.R.

116—124.1; 146—68